United States Patent
Lin

(12) United States Patent (10) Patent No.: US 7,526,843 B2
Lin (45) Date of Patent: May 5, 2009

(54) SNAP HOOK

(76) Inventor: Kuan-Yu Lin, No. 530-32, Yanping Rd., Changhua City, Changhua Hsien (TW)

( * ) Notice: Subject to any disclaimer, the term of this patent is extended or adjusted under 35 U.S.C. 154(b) by 335 days.

(21) Appl. No.: 11/474,939

(22) Filed: Jun. 27, 2006

(65) Prior Publication Data

US 2007/0294867 A1   Dec. 27, 2007

(51) Int. Cl.
*F16B 45/04* (2006.01)
(52) U.S. Cl. .................... 24/600.4; 24/600.2; 24/600.8
(58) Field of Classification Search ............... 24/600.4, 24/600.2, 600.5, 600.6, 600.7, 600.8, 265 H, 24/601.1, 601.6; 294/82.22, 82.23
See application file for complete search history.

(56) References Cited

U.S. PATENT DOCUMENTS

| 275,537 | A | * | 4/1883 | Straw | 24/600.8 |
| 759,806 | A | * | 5/1904 | Broga | 24/600.7 |
| 898,789 | A | * | 9/1908 | Schleicher | 59/95 |
| 1,598,684 | A | * | 9/1926 | Jensen | 24/600.8 |
| 2007/0137008 | A1 | * | 6/2007 | Anstee | 24/600.7 |

* cited by examiner

*Primary Examiner*—Robert J Sandy
(74) *Attorney, Agent, or Firm*—Rosenberg, Klein & Lee

(57) ABSTRACT

A snap hook has a body, a sliding latch, a resilient element, a swivel and a connector. The body has a shaft and a hook. The shaft is tubular and has an upper end and a lower end. The hook is connected to and extends from the upper end of the shaft. A guide slot is defined longitudinally the shaft and communicates with the lower end of the shaft. Accordingly, no sharp edges are formed near the sliding latch so a person opening the snap hook will not be injured. In addition, assembling the snap hook is easy.

8 Claims, 6 Drawing Sheets

SNAP HOOK

BACKGROUND OF THE INVENTION

1. Field of Invention

The present invention relates to a snap hook, and more particularly to a snap hook that will not hurt a user's finger and is easy to assemble.

2. Description of the Related Art

With reference to FIG. 6, a conventional snap hook comprises a body (91), a sliding latch (92), a spring (93) and a swivel (94).

The body (91) has a shaft (912) and a hook (911). The shaft (912) is tubular and has an upper end (914), a lower end (915), a guide slot (917) and two annular collars (918). The upper end (914) of the shaft (912) is open. The lower end (915) is closed. The guide slot (917) is defined longitudinally through the shaft (912) and communicates with the upper end (914) of the shaft (912). However, where the guide slot (917) communicates with the upper end (914), two sharp edges are formed, which can easily injure a person operating the snap hook. The two annular collars (918) are formed parallel to each other at the lower end (915) of the shaft (912). The hook (911) has a proximal end, a distal end and an opening (913). The proximal end is formed on and protrudes longitudinally from the shaft (912) at the upper end (914). The distal end aligns with the upper end (914) of the shaft (912). The opening (913) is defined between the distal end of the hook (911) and the upper end (914) of the shaft (912).

The sliding latch (92) has a sliding rod (921) and a thumb tab (922). The sliding rod (921) is mounted slidably in the shaft (912), protrudes from the upper end (914) of the shaft (912) and has a distal end and a proximal end. The distal end selectively abuts the distal end of the hook (911). However, the sliding rod (921), the guide slot (917) or the distal end of the hook (911) is easily deformed during assembly when the sliding rod (921) is inserted into the upper end (914) of the shaft (912). The thumb tab (922) is formed on and protrudes radially from the sliding rod (921) and is mounted slidably in the guide slot (917).

The spring (93) is mounted in the shaft (912) between the proximal end of the sliding rod (921) and the lower end (915) of the shaft (912), presses the sliding latch (92) against the distal end of the hook (911) and closes the opening (913) until the thumb tab (922) is pressed toward the lower end (915) of the shaft (912). However, after extended use, the spring (93) weakens, and the snap hook easily opens when the thumb tab (922) is inadvertently pressed or struck.

The swivel (94) is connected rotatably to the shaft (912) between the annular collars (918) and has an upper flat surface (941) and an eye. The upper flat surface (941) is mounted rotatably on the shaft (912) between the annular collars (918) and has a mounting hole (942). However, the upper flat surface (941) must be crimped or squeezed to be held between the annular collars (918). The mounting hole (942) is formed through the upper flat surface (941) and has a bottom end. The eye extends down from the upper flat surface (941).

Furthermore, components of the conventional snap hook are commonly cast so components may vary somewhat in size, which further complicates the fabrication process and causes the sliding latch (92) to be overly loose.

To overcome the shortcomings, the present invention provides a snap hook to mitigate or obviate the aforementioned problems.

SUMMARY OF THE INVENTION

The primary objective of the present invention is to provide a snap hook that is safe to use and easy to assemble.

Another objective of the present invention is to provide a snap hook with components that fit precisely without being overly loose.

A tertiary objective of the present invention is to provide a snap hook that can be locked and will not inadvertently open.

The snap hook in accordance with the present invention comprises a body, a sliding latch, a resilient element, a swivel and a connector.

The body has a shaft and a hook. The shaft is tubular and has an upper end, a lower end and a guide slot. The guide slot is formed longitudinally through the shaft and communicates with the lower end. The hook is formed on and protrudes from the upper end of the shaft and has a proximal end, a distal end and an opening. The opening is formed between the distal end of the hook and the upper end of the shaft.

The sliding latch has a sliding rod and a thumb tab. The sliding rod is mounted slidably in the tubular shaft, aligns with and selectively abuts the distal end of the hook to close the opening and has an outer end and an inner end. The outer end of the sliding rod protrudes from the upper end of the shaft. The thumb tab is formed on and protrudes radially from the sliding rod and is mounted slidably in the guide slot.

The resilient element is mounted in the tubular shaft at the lower end, abuts the inner end of the sliding rod and presses the outer end of the sliding rod against the distal end of the hook.

The swivel is mounted rotatably on the shaft at the lower end.

The connector is mounted in the lower end of the tubular shaft and holds the resilient element in the tubular shaft and the swivel on the tubular shaft.

Other objectives, advantages and novel features of the invention will become more apparent from the following detailed description when taken in conjunction with the accompanying drawings.

DETAILED DESCRIPTION OF THE INVENTION

Figure 1:
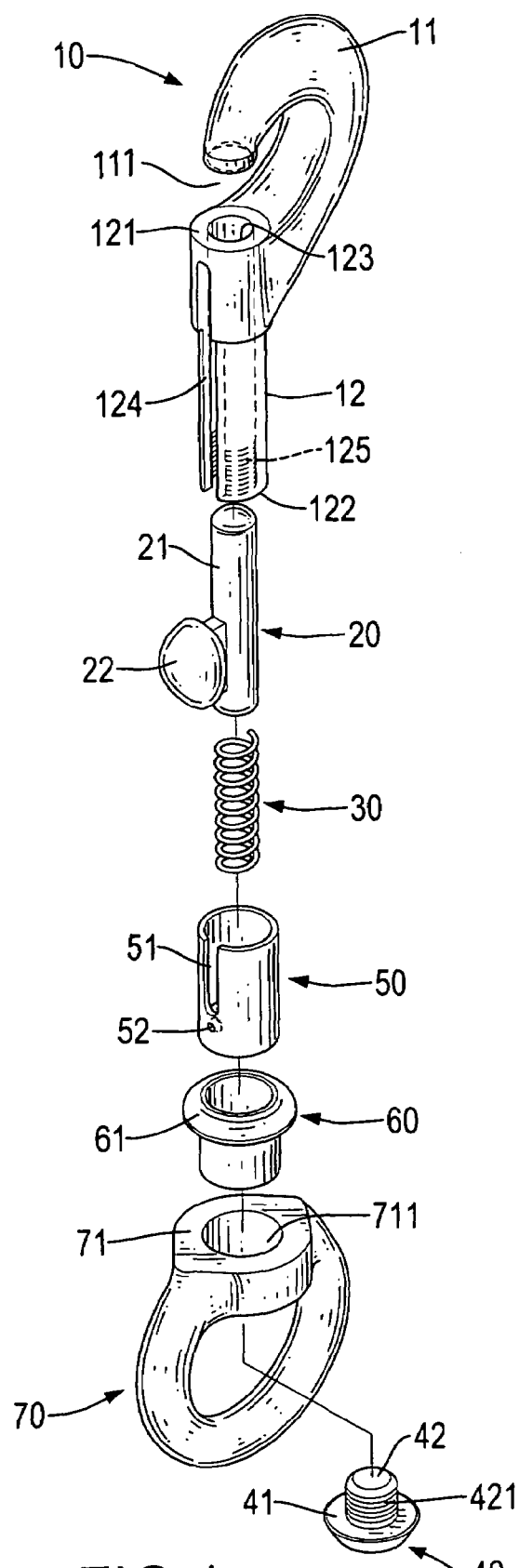
FIG. 1 is an exploded perspective view of a snap hook in accordance with the present invention.
Figure 2:
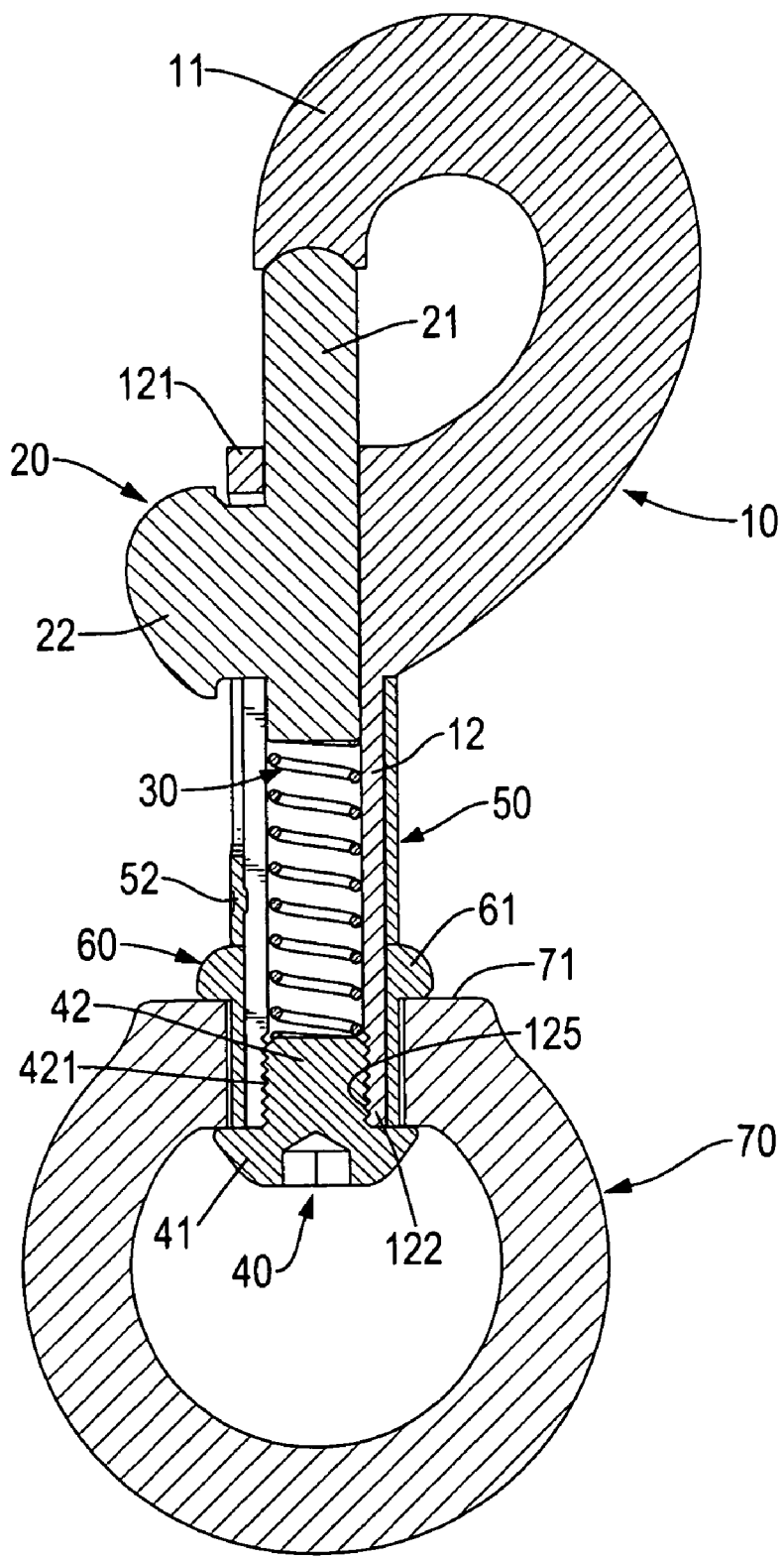
FIG. 2 is a cross sectional side view of the snap hook in FIG. 1.
Figure 3:
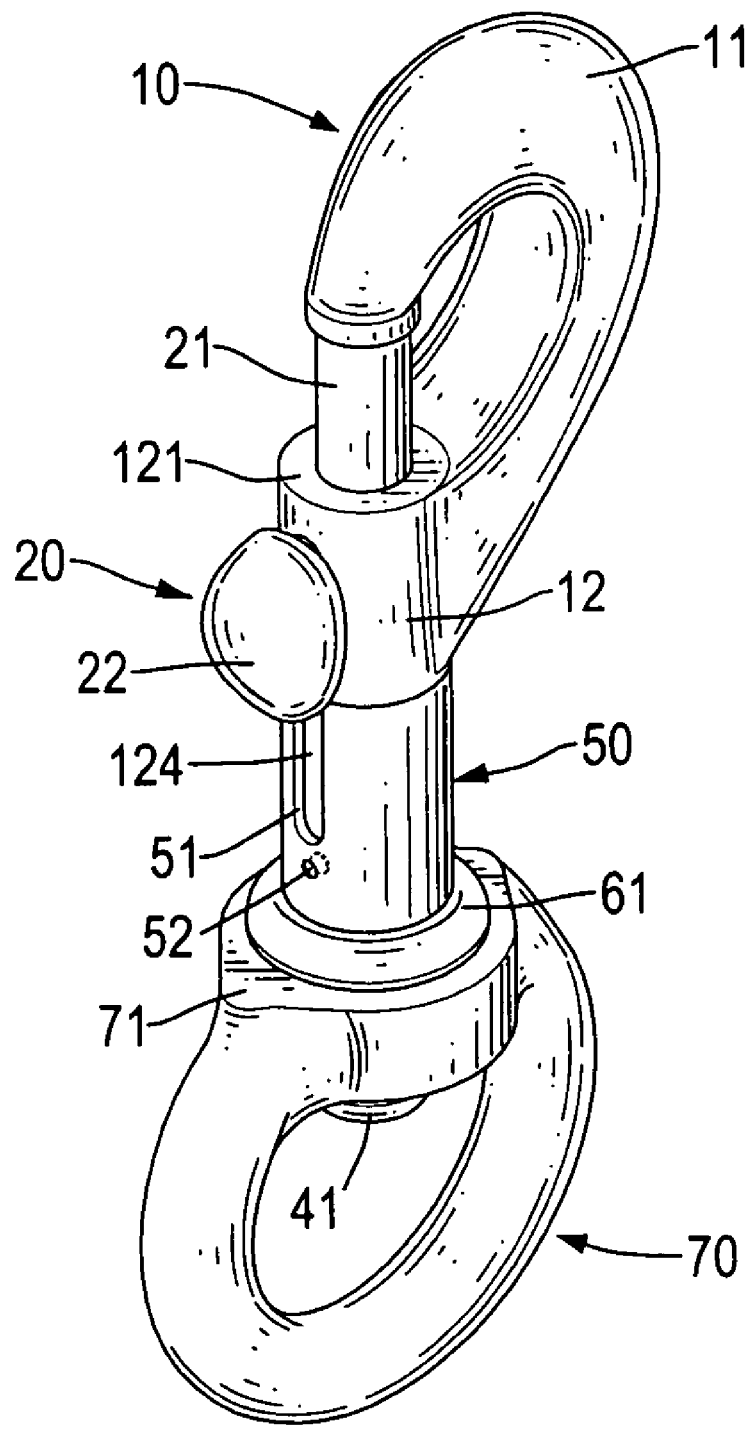
FIG. 3 is a perspective view of the snap hook in FIG. 1.
Figure 4:
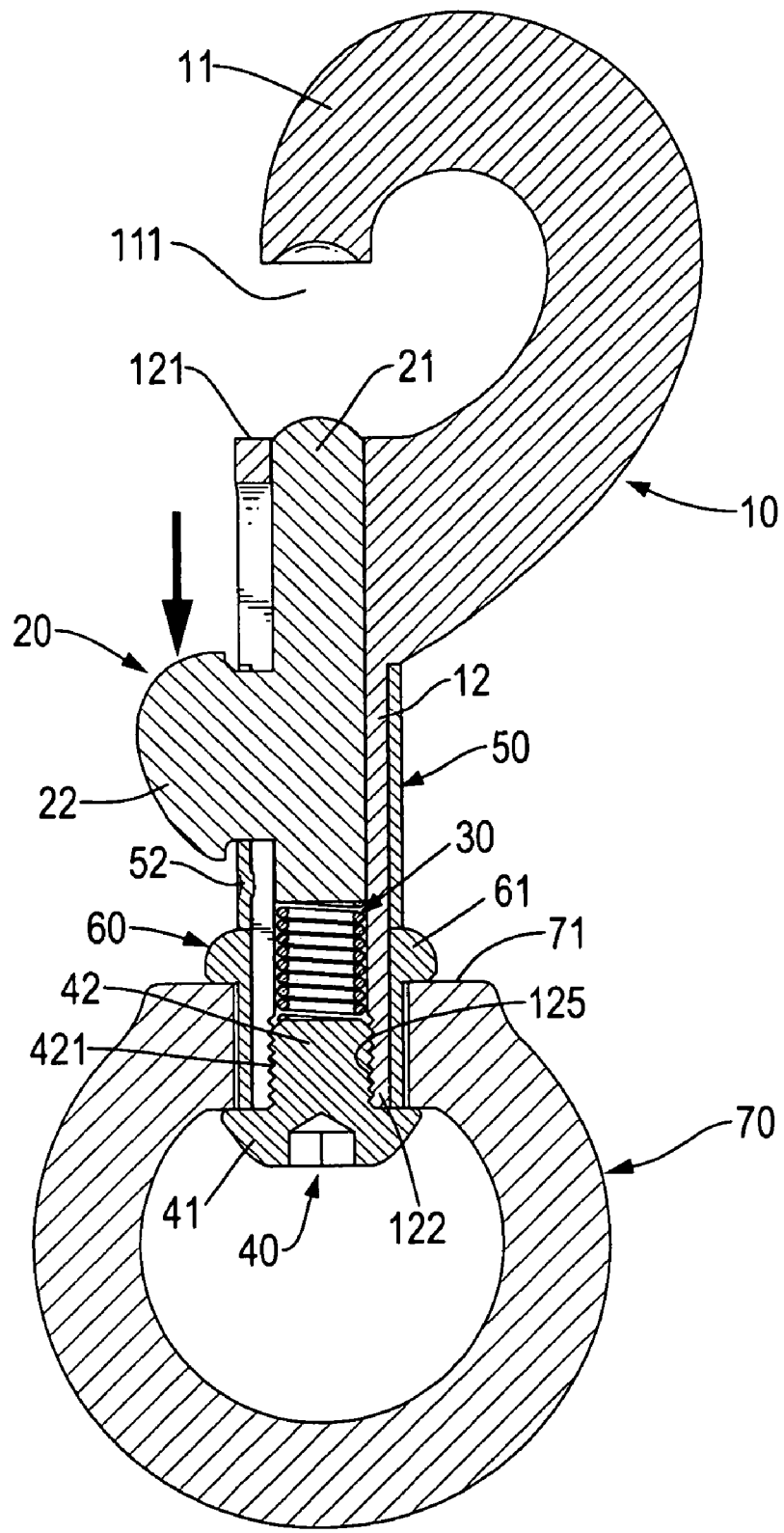
FIG. 4 is a cross sectional operational side view of the snap hook in FIG. 1 with the sliding latch is pulled down.

With reference to FIGS. 1, 2 and 3, a snap hook in accordance with the present invention comprises a body (10), a sliding latch (20), a resilient element (30), an optional latch lock (50), an optional bushing (60), a swivel (70) and a connector (40).

The body (10) has a shaft (12) and a hook (11). The shaft (12) is tubular and has an upper end (121), a lower end (122), a guide slot (124) and an optional inner thread (125). The guide slot (124) is defined longitudinally through the shaft (12) and communicates with the lower end (122) of the shaft (12). The inner thread (125) is formed inside the shaft (12) at the lower end (122). The hook (11) has a proximal end, a distal end and an opening (111). The proximal end is formed on and protrudes out from the upper end (121) of the shaft (12). The distal end aligns with and is separated from the upper end (121) of the shaft (12) and may be concave. The opening (111) is formed between the distal end of the hook (12) and the upper end (121) of the shaft (12).

The sliding latch (20) is mounted slidably in and protrudes from the tubular shaft (12), selectively closes the opening (111) in the hook (11) and has a sliding rod (21) and a thumb tab (22). The sliding rod (21) is mounted in the tubular shaft (12) through the lower end (122) of the shaft (12), is mounted slidably in the tubular shaft (12), aligns with and selectively abuts the distal end of the hook (11) to close the opening (111) and has an outer end and an inner end. The outer end of the sliding rod (21) protrudes from the upper end (121) of the shaft (12) and may be convex when the distal end of the hook (11) is concave. The thumb tab (22) is formed on and protrudes radially from the sliding rod (21), is mounted slidably in the guide slot (124) and pulls the outer end of the sliding rod (21) into the tubular shaft (12) when the thumb tab (22) is pulled toward the lower end (122) of the shaft (12).

The resilient element (30) is mounted in the tubular shaft (12) at the lower end (122), abuts the inner end of the sliding rod (21), presses the outer end of the sliding rod (21) against the distal end of the hook (1) and may be a spring, resilient material or the like.

Figure 5:
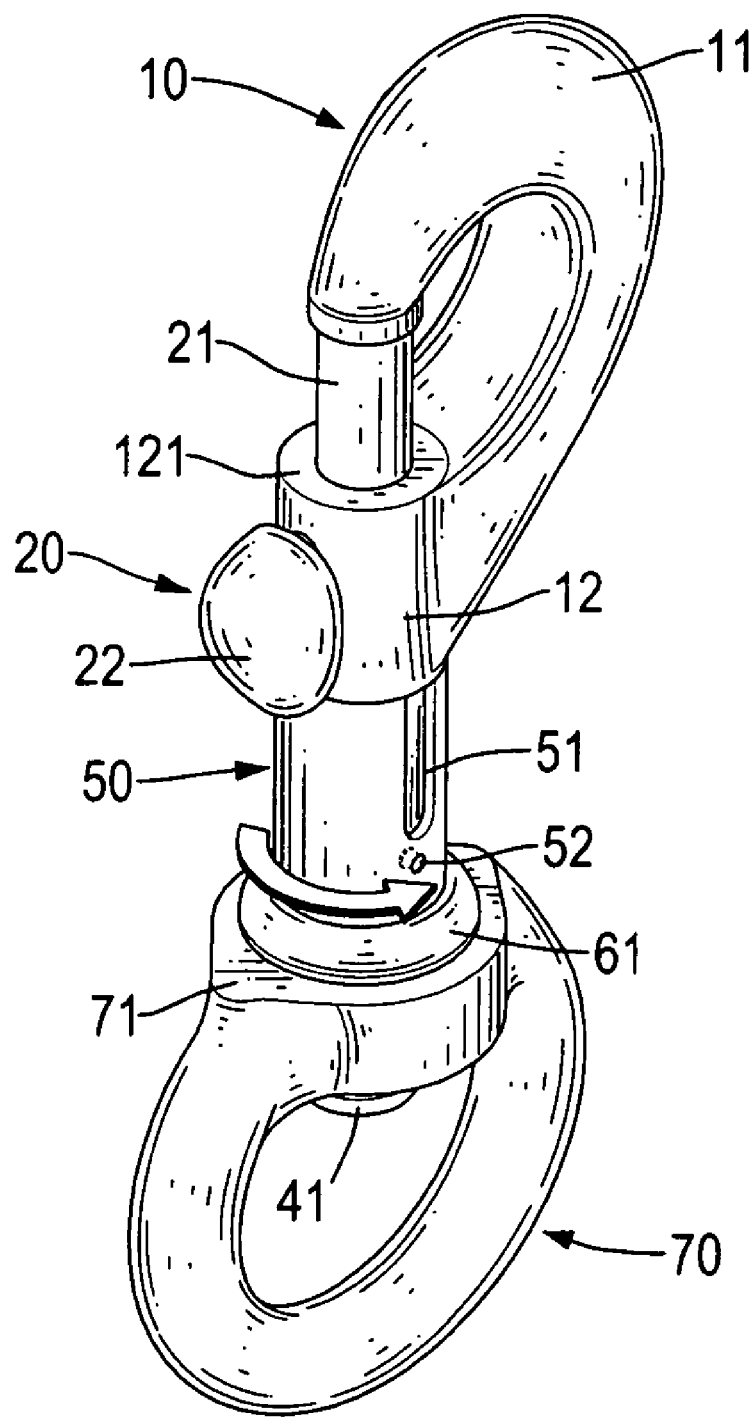
FIG. 5 is an operational perspective view of the snap hook in FIG. 1 with the latch lock closed.
Figure 6:
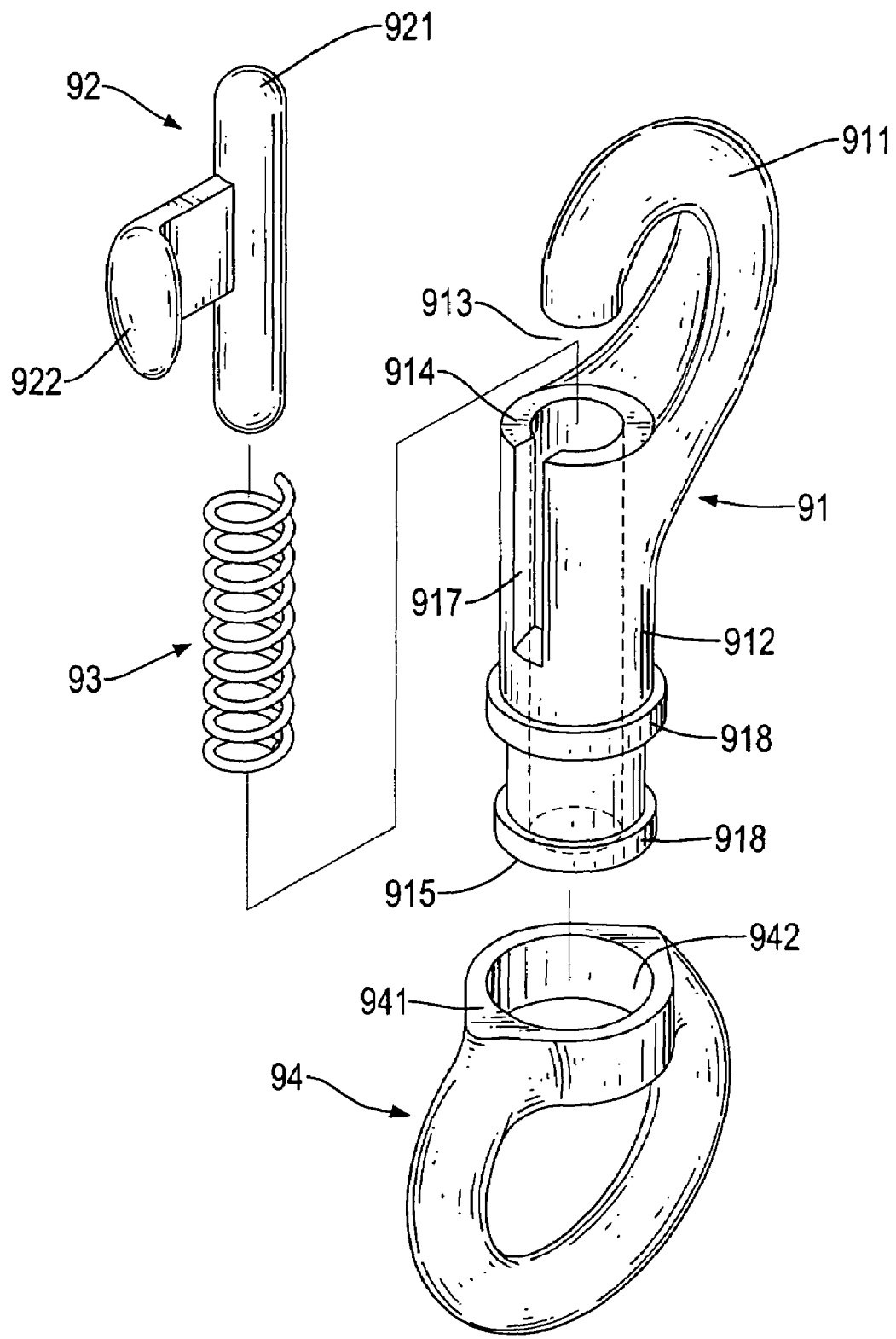
FIG. 6 is an exploded perspective view of a conventional snap hook in accordance with the prior art.

With further reference to FIG. 5, the latch lock (50) is tubular, is mounted rotatably on the shaft (12) of the body (10) and has an upper end, a lower end, a release slot (51) and a positioning boss (52). The release slot (51) is defined longitudinally through the latch lock (50) and communicates with the upper end. The positioning boss (52) is formed on and protrudes slightly into the latch lock (50) between the release slot (51) and the lower end and selectively is held in the guide slot (124) to hold the latch lock (50) in an unlocked position so the thumb tab (22) can move toward the lower end (122) of the shaft (12) or press against the shaft (12) to block the guide slot (124).

The bushing (60) is tubular, is mounted rotatably on the shaft (12) of the body (10) and has an upper end, a lower end and an annular lip (61). The annular lip (61) is formed on and protrudes out from the upper end of the bushing (60) and abutting the lower end of the latch lock (50).

The swivel (70) is mounted rotatably on the bushing (60) and has an upper flat surface (71) and an eye. The upper flat surface abuts the annular lip (61) of the bushing (60) and has a mounting hole (711). The mounting hole (711) is formed through the upper flat surface (71) and has a bottom end. The eye extends down from the upper flat surface (71).

The connector (40) is mounted through the mounting hole (711) in the swivel (70) and the bushing (60), connects to the lower end (122) of the shaft (12) to hold the swivel (70) and the bushing (60) rotatably on the lower end of the shaft (12) of the body (10) and has a lower end, a head (41) and a shaft (42). The head (41) is formed at the lower end of the connector (40), is larger than the mounting hole (711) in the swivel (70) and abuts the bottom end of the mounting hole (711). The shaft (42) is formed coaxially on and extends up from the head (41), is mounted through the mounting hole (711) in the swivel (70) and the bushing (60), is mounted in and connected to the lower end of the shaft (12) of the body (10), abuts and holds the resilient element (30) against the sliding rod (21) and may have an outer thread (421). The outer thread (421) corresponds to and screws into the inner thread (125) in the lower end (122) of the shaft (12) of the body (10).

The snap hook as described is easier to assemble, more stable and less likely to injure a user than a conventional snap hook.

Specifically, components of the snap hook can be manufactured from standard stock items and machined or cast so the components match each other precisely and do not wobble.

Assembly of the snap hook comprises sequential mounting of the sliding rod (21) and the resilient element (30) through the lower end (122) of the shaft (12), mounting the latch lock (50), the bushing (60) and the swivel (70) on the shaft (12) of the body (10) and attaching the connector (40) to the lower end (122) of the shaft (12). Consequently none of the components are deformed during the assembly of the snap hook.

Furthermore, because the guide slot (124) does not communicate with the opening (111) in the hook (11), users are not exposed to any sharp edges when the thumb tab (22) is pressed to open the hook (11).

Furthermore, rotating the latch lock (50) when the sliding latch (20) is pushed up by the resilient element (30) moves the release slot (51) out of alignment with the guide slot (124) and keeps the sliding latch (20) from inadvertently opening.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A snap hook comprising:
  a body having
    a shaft being tubular and having
      an upper end;
      a lower end; and
      a guide slot being defined longitudinally through the shaft and communicating with the lower end of the shaft; and
    a hook having
      a proximal end being formed on and protruding out from the upper end of the shaft;
      a distal end; and
      an opening being formed between the distal end of the hook and the upper end of the shaft;
  a sliding latch being mounted slidably in and protruding from the tubular shaft, selectively closing the opening in the hook and having
    a sliding rod being mounted in the tubular shaft through the lower end of the shaft, being mounted slidably in the tubular shaft, aligning with and selectively abutting the distal end of the hook and having
      an outer end protruding from the upper end of the shaft; and
      an inner end; and
    a thumb tab being formed on and protruding radially from the sliding rod and being mounted slidably in the guide slot;
  a resilient element being mounted in the tubular shaft at the lower end, abutting the inner end of the sliding rod and pressing the outer end of the sliding rod against the distal end of the hook;

a swivel being mounted rotatably on the shaft and having
  an upper flat surface having a mounting hole formed through the upper surface; and
  an eye extending down from the upper flat surface;
a connector mounted through the mounting hole in the swivel, connecting to the lower end of the shaft and having
  a lower end;
  a head being formed at the lower end of the connector, being larger than the mounting hole in the swivel and abutting the bottom end of the mounting hole; and
  a shaft being formed coaxially on and extending up from the head, being mounted through the mounting hole in the swivel, being mounted in and connected to the lower end of the shaft of the body and abutting and holding the resilient element against the sliding rod; and,
a latch lock being mounted rotatably on the shaft of the body and having
  an upper end;
  a lower end;
  a release slot being defined longitudinally through the latch lock and communicating with the upper end; and
  a positioning boss being formed on and protruding slightly into the latch lock between the release slot and the lower end.

2. The snap hook as claimed in claim 1, wherein
the distal end of the hook is concave; and
the outer end of the sliding rod is convex.

3. The snap hook as claimed in claim 1, wherein the resilient element is a spring.

4. The snap hook as claimed in claim 1, wherein
the shaft of the body further has an inner thread formed at the lower end of the shaft; and
the shaft of the connector has an outer thread corresponding to and screwing into the inner thread in the lower end of the shaft of the body.

5. The snap hook as claimed in claim 1, further comprising
a bushing being tubular, being mounted on the shaft of the body and having
  an upper end;
  a lower end; and
  an annular lip formed on and protruding out from the upper end of the bushing and abutting the lower end of the latch lock; and
the upper flat surface of the swivel abuts the annular lip of the bushing; and
the connector shaft is mounted through the bushing.

6. The snap hook as claimed in claim 5, wherein
the distal end of the hook is concave; and
the outer end of the sliding rod is convex.

7. The snap hook as claimed in claim 6, wherein the resilient element is a spring.

8. The snap hook as claimed in claim 7, wherein
the shaft of the body further has an inner thread formed at the lower end of the shaft; and
the shaft of the connector has an outer thread corresponding to and screwing into the inner thread in the lower end of the shaft of the body.

* * * * *